United States Patent
Vassgård

(10) Patent No.: US 10,833,449 B2
(45) Date of Patent: Nov. 10, 2020

(54) HIGH VOLTAGE SUBSEA CONNECTION ASSEMBLY

(71) Applicant: Benestad Solutions AS, Lierskogen (NO)

(72) Inventor: Johannes Arngrim Vassgård, Rasta (NO)

(73) Assignee: Benestad Solutions AS, Lierskogen (NO)

( * ) Notice: Subject to any disclaimer, the term of this patent is extended or adjusted under 35 U.S.C. 154(b) by 178 days.

(21) Appl. No.: 16/305,362

(22) PCT Filed: Jun. 2, 2017

(86) PCT No.: PCT/EP2017/063482
§ 371 (c)(1),
(2) Date: Nov. 28, 2018

(87) PCT Pub. No.: WO2017/207766
PCT Pub. Date: Dec. 7, 2017

(65) Prior Publication Data
US 2020/0287318 A1    Sep. 10, 2020

(30) Foreign Application Priority Data
Jun. 3, 2016    (NO) .................................. 20160959

(51) Int. Cl.
*H01R 13/523*    (2006.01)
*H01R 13/52*    (2006.01)
(Continued)

(52) U.S. Cl.
CPC ....... *H01R 13/523* (2013.01); *H01R 13/5227* (2013.01); *E21B 33/0385* (2013.01); *G02B 6/3816* (2013.01); *H01R 13/629* (2013.01)

(58) Field of Classification Search
CPC .. H01R 13/523; H01R 13/629; H01R 13/193; H01R 13/53; G02B 6/3816; E21B 33/0385
See application file for complete search history.

(56) References Cited

U.S. PATENT DOCUMENTS 9,843,129 B2 * 12/2017 Burrow ............... H01R 13/5213
2012/0279718 A1 * 11/2012 Rocke .................. E21B 33/0385
                                                              166/341
2017/0187143 A1 * 6/2017 Vassgård ............. E21B 33/0385

FOREIGN PATENT DOCUMENTS

EP    2853679 A1    4/2015
EP    2953211 A1    12/2015
(Continued)

OTHER PUBLICATIONS

Pugliese, Sandro, "International Search Report" prepared for PCT/EP2017/063482, dated Aug. 1, 2017, four pages.

Primary Examiner — Tho D Ta
(74) Attorney, Agent, or Firm — Shackelford, Bowen, McKinley & Norton, LLP

(57) ABSTRACT

High voltage, subsea connection assembly having a male part (101) comprising a male housing (103) with a liquid chamber (110), and a male housing aperture (107). A male pin (106) is positioned within the male housing aperture. A female part (1) has a female housing (5) with a liquid chamber (10) with a dielectric liquid, and a male pin receiving aperture (7). The male pin is axially movable into and out of the female housing (5). An aperture channel (8) has a rear section (12), the radial inwardly directed face of which together with an outer radial face of the male pin (106) defines a flushing gap (14) when the male pin (106) is positioned in the rear section (12). An exit channel (16) is (Continued)

arranged in the aperture channel, between the rear section, and the male pin receiving aperture or the male housing aperture.

6 Claims, 7 Drawing Sheets

(51) Int. Cl.
*E21B 33/038* (2006.01)
*G02B 6/38* (2006.01)
*H01R 13/629* (2006.01)

(56) References Cited

FOREIGN PATENT DOCUMENTS

| FR | 2529396 A1 | 12/1983 |
|----|-----------|---------|
| GB | 2193239 A | 2/1988 |
| GB | 2389466 A | 12/2003 |
| GB | 2402560 A | 12/2004 |
| WO | WO-2015199550 A2 | 12/2015 |

* cited by examiner

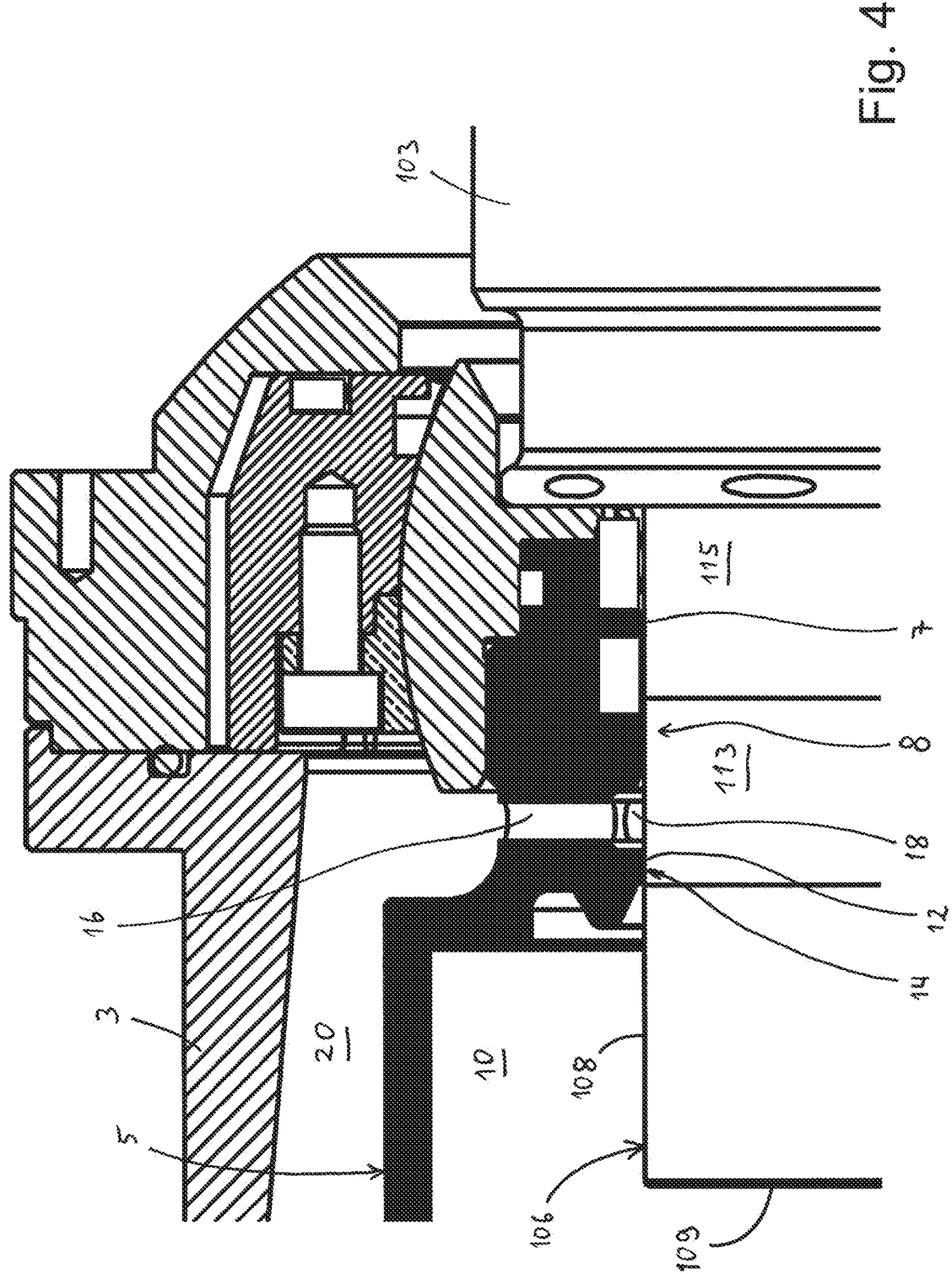

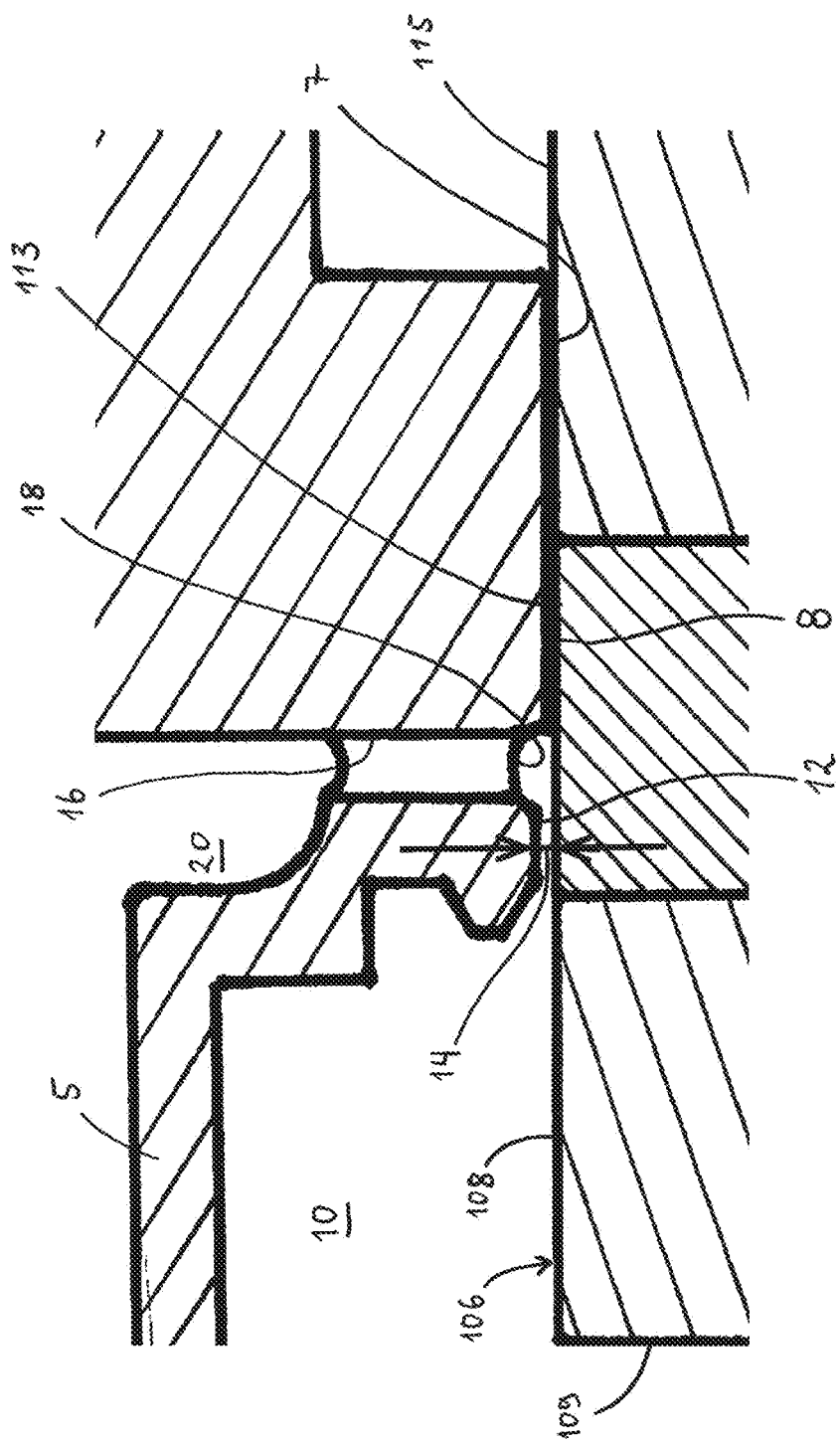

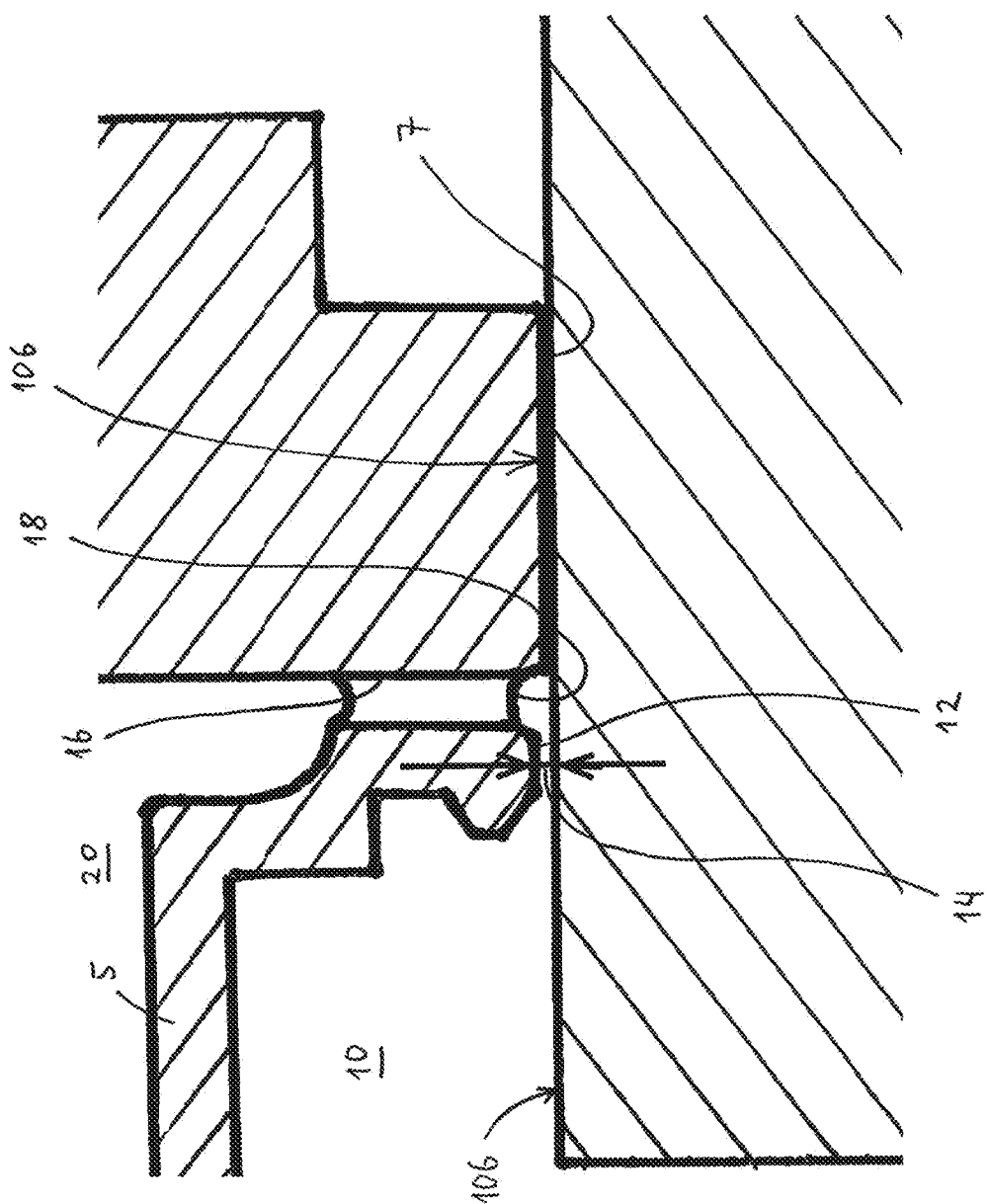

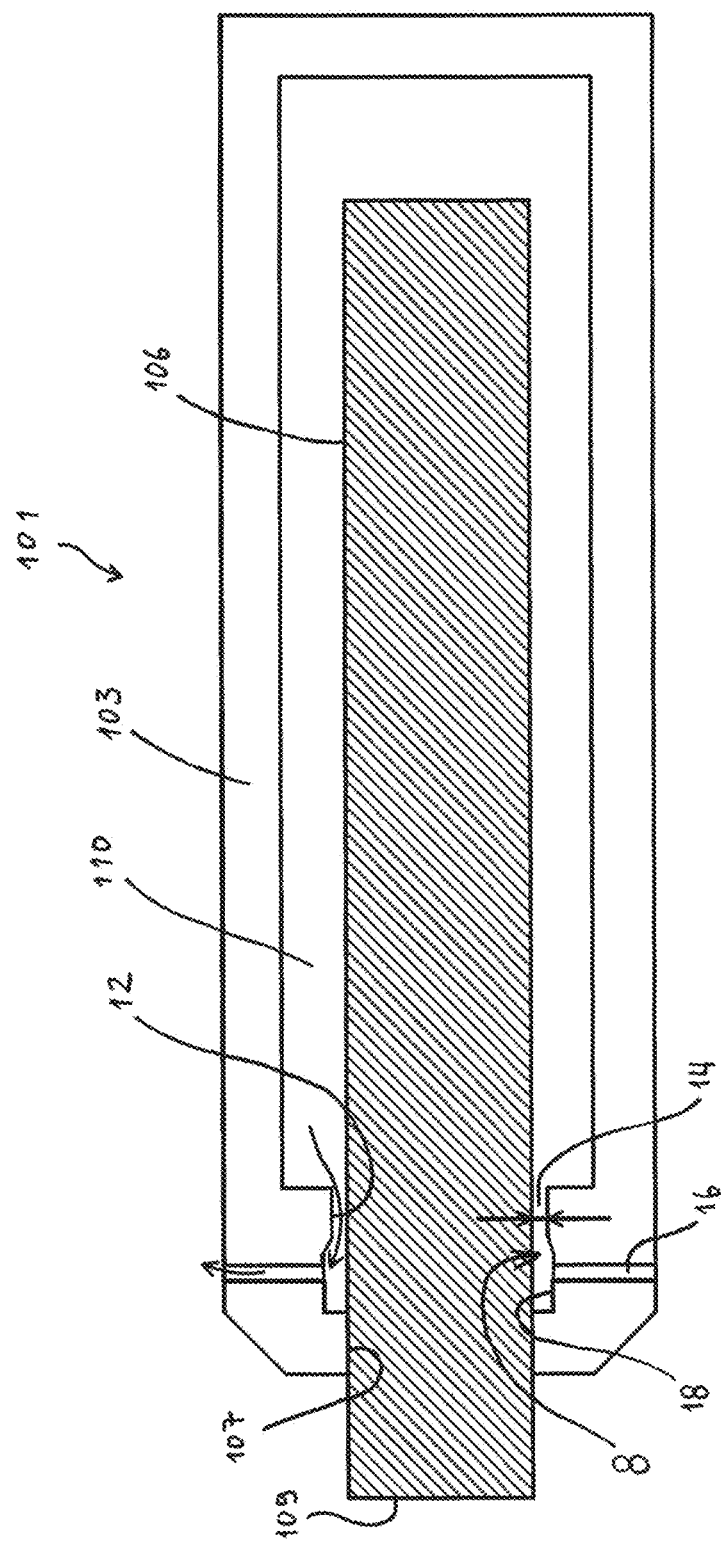

HIGH VOLTAGE SUBSEA CONNECTION ASSEMBLY

The present invention relates to a subsea coupling arrangement for high voltage transmission. The coupling arrangement is a wet-mate type arrangement, configured to connect and disconnect in a subsea environment.

BACKGROUND

A number of challenges arise when designing such subsea power connectors. In particular, as is well known to the skilled person, the combination of high voltage and conducting sea water puts high demands on the connection assembly. Another challenge is to design a connection assembly which will function as intended after a long period of inactivity. For instance, such connectors may remain in a constant position for several years in a subsea environment, after which they need to function as intended.

A common setup for such connection assemblies is to mate a male and a female part. Typically, a male pin having a contact face is inserted into the female section until the contact face abuts an oppositely facing female contact face. During the movement of the male pin, it is normally an object to avoid or limit insertion of seawater into the female part.

A typical example of such a subsea electrical connection assembly is shown in patent application publication WO2015199550. In this solution, a male and female part are aligned with respect to each other. Then, a male pin supported in the male part is inserted into the female part. The female part has a movable core arranged in a male pin receiving aperture, which is moved axially into the female part upon insertion of the male pin. A male pin contact face faces radially outwards at a front part of the male pin. In a receiving bore of the female part, a radially inwardly facing contact face abuts the male pin contact face, when in the inserted, connected position.

Another typical example of such a subsea electric connection assembly is shown in FR2529396. When inserting the male pin, a movable core is pushed into the female part, letting radially facing contact electric contacts mate with opposite electric contacts in the female bore. The male pin is movably supported within a male housing which is aligned with a female housing before inserting the male pin.

In order to, inter alia, establish appropriate contact between the two electric contact faces of the male pin and the female part, respectively, it is known to arrange means for cleaning the contact face of the male pin. Such means can typically be scrapers arranged in association with the male pin receiving aperture of the female part. When moving the male pin through the scraper, impurities will be scraped off the electric contact face to a great extent.

There is however a limit to the efficiency of such scrapers. In particular, as they age, they will exhibit less resilience and be less effective. Hence, an object of the present invention may be to provide a connection assembly of the above mentioned type, which involves another solution for cleaning of the electric contact face of the male pin.

An additional object may be the prevention or limitation of sea water entering into the female part, when the male pin is inserted. Droplets of sea water being present on the male pin, or dispersed in the dielectric liquid in the female housing, represent a risk of electric sparkover.

THE INVENTION

According to the present invention, there is provided a high voltage, subsea connection assembly having a male part comprising a male housing with a liquid chamber with a dielectric liquid, and a male housing aperture, wherein a male pin is supported in the male housing and positioned within the male housing aperture. A female part is provided with a female housing with a liquid chamber with a dielectric liquid, and a male pin receiving aperture. The male pin is axially movable into and out of the female housing through the male pin receiving aperture, between a non-inserted non-connected position and an inserted connected position. Moreover, the female housing comprises an electric contact face which is configured to contact an electric contact face of the male pin when the male pin is in the inserted connected position. The male pin receiving aperture or the male housing aperture constitutes a forward section of an axially extending aperture channel configured to encompass an axial section of the male pin. The aperture channel has a rear section. The radial inwardly directed face of the rear section, together with an outer radial face of the male pin, defines a flushing gap when the male pin is positioned in the rear section. Furthermore, at least one liquid exit channel is arranged in the aperture channel, in a position between the rear section, and the male pin receiving aperture or the male housing aperture, respectively.

With the term high voltage is herein meant voltages of 1 kV and above.

With the solution according to the present invention, the radial face of the male pin will be flushed by the dielectric liquid which is displaced and flowing through the flushing gap. Also, possible water which may be brought with the male pin through the male pin receiving aperture, can be flushed away. This reduces the amount of and/or the risk of having sea water entering the female housing and/or the male housing. Thus, the amount of water or other impurities in the dielectric liquid is reduced. This consequently reduces the risk of dielectric breakdown.

Advantageously, the liquid exit channel constitutes the only liquid exit path out of the liquid chamber.

The skilled person will appreciate that there may exist more than one liquid exit channel. In some embodiments, a plurality of liquid exit channels may be distributed about the circumference of the receiving channel.

In some embodiments, the electric contact face of the male pin can face in a substantially radial, outwards direction. In such embodiments, the electric contact face in the female housing faces in an inwardly radial direction, so that the facing electric contact faces can engage and make up an electric contact between the male and the female part.

In such embodiments, the dielectric liquid flowing through the flushing gap during insertion of the male pin, can clean the electric contact face of the male pin, thereby obtaining a better electric contact between the two engaged electric contact faces. Thus, in such embodiments of the present invention, one obtains a removal of water or other impurities being carried with the male pin, thereby preventing it from entering the housing, and one obtains in addition a cleaning of the electric contact face immediately before contact is made up.

In some embodiments, the female housing or the male housing is arranged within an outer housing, and the liquid exit channel can communicate between a liquid receiving compartment and the liquid chamber. The liquid receiving compartment can in such embodiments be arranged between the female housing or the male housing, and the outer housing.

In embodiments where the female part comprises the flushing gap, the rear section of the aperture channel can be arranged axially between the liquid exit channel and the electric contact face of the female part. Also, the liquid exit channel can then be arranged axially between the rear section and the male pin receiving aperture.

In some embodiments, a distribution groove that encircles the aperture channel in a position axially between the rear section and the male pin receiving aperture or the male housing aperture, respectively. Preferably, in such embodiments a plurality of liquid exit channels communicate between the distribution groove and the outside of the female housing or the male housing, respectively.

EXAMPLE OF EMBODIMENT

While various aspects of the present invention have been discussed in general terms above, a non-limiting, detailed example of embodiment will be given in the following with reference to the drawings, in which FIG. 1 is a cross section view through a female part of a connection assembly according to the invention, shown in a non-connected state;

FIG. 4 is an enlarged part of FIG. 3;

FIG. 5 is an enlarged, principle view, illustrating the key function of the present invention;

FIG. 6 is an enlarged, principle view corresponding to FIG. 5, however with another type of male pin; and FIG. 7 is a principle view of an embodiment utilizing the invention in a male housing.

Figure 1:
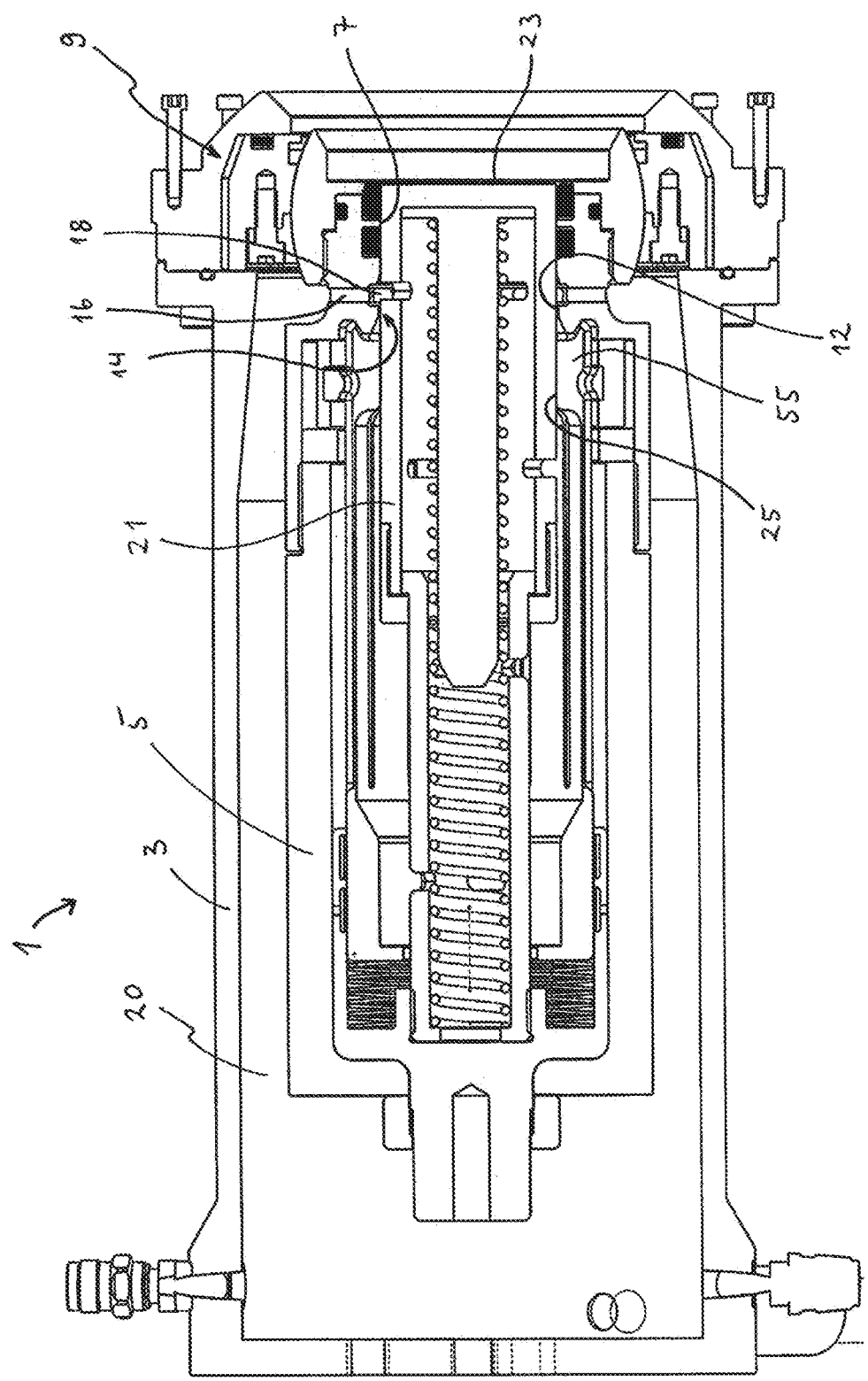

FIG. 1 shows a cross section view through a female part 1 of a subsea high voltage connection assembly according to the present invention. In this embodiment, the female part 1 has two housings, namely an outer housing 3 and an inner housing 5. In other embodiments, there may be only one housing, corresponding to the inner housing 5. The inner housing 5 has a male pin receiving aperture 7 at an axial outer end.

At the region of the aperture 7, the inner housing 5 is connected to the outer housing 3 via a flexible support arrangement 9. The flexible support arrangement 9 provides some flexibility of the orientation of the inner housing 5 with respect to the outer housing 3. Since the flexible support arrangement 9 is not significant to the invention disclosed herein, it will not be further discussed. The skilled person will appreciate that the invention is applicable also in embodiments without such a flexible support arrangement.

In FIG. 1, the female part 1 is shown in a non-connected mode. In this mode, a core element, here in form of a core sleeve 21, is arranged in the male pin receiving aperture 7 of the inner housing 5. The core sleeve 21 has a closed front face 23 which will be in contact with the ambient seawater when it is submerged and the male part is not present. As will appear from the discussion further below, when the male pin is inserted into the female part 1, the front face 23 will abut the male pin, and the entire core sleeve 21 will be pushed axially into the inner housing 5 (to the left in FIG. 1).

Figure 2:
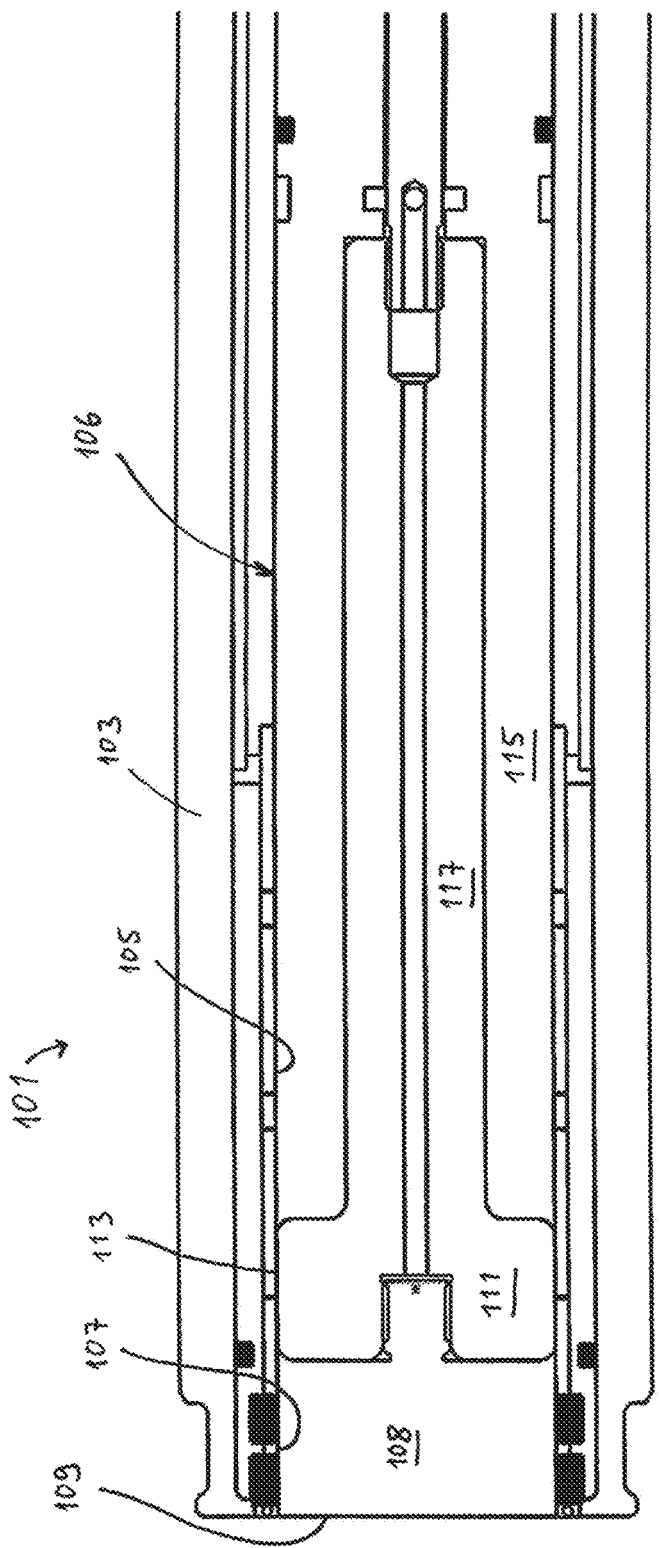
FIG. 2 is a cross section view through a male part of the connection assembly.

Reference is made to FIG. 2 for a presentation of a male part 101 which is suited for being used with the female part 1 shown in FIG. 1. The male part 101 has a male housing 103 with an inner male bore 105. Within the male bore 105, there is arranged a male pin 106, which is axially movable, partially out from the male housing 103, through a male housing aperture 107. As with the male pin receiving aperture 7 of the female part 1, the male housing aperture 107 is also provided with seals which seal against the outer face of the movable male pin 106.

The male pin 106 has a front portion 108 with a front face 109. The front portion 108 is made of an electrically insulating material. Axially behind the front portion 108, the male pin 106 has a conduction portion 111 with radially outwardly facing electric contact face 113. Axially behind the electric contact face 113, the male pin 106 has an insulating stem portion 115 which extends axially backwards. The conduction portion 111 is electrically connected to a stem conductor 117 inside the insulating stem portion 115.

When the male pin 106 is inserted into the female part 1 to a connected position, the electric contact face 113 of the male pin 106 is configured to contact an oppositely faced electric contact face 25 of the female part 1. This electric contact face 25 is shown in FIG. 1. In this embodiment, the electric contact face 25 is arranged on a radially movable actuation component 55. It should be clear however, that it could also be arranged on a radially fixed element, wherein the opposite electric contact faces 113, 25 would enter into contact with each other with a mutual sliding, axial movement.

The female part 1 shown in FIG. 1 depicts various components which are not relevant for the topic of the present invention, and which therefore will not be discussed in detail herein.

Figure 3:
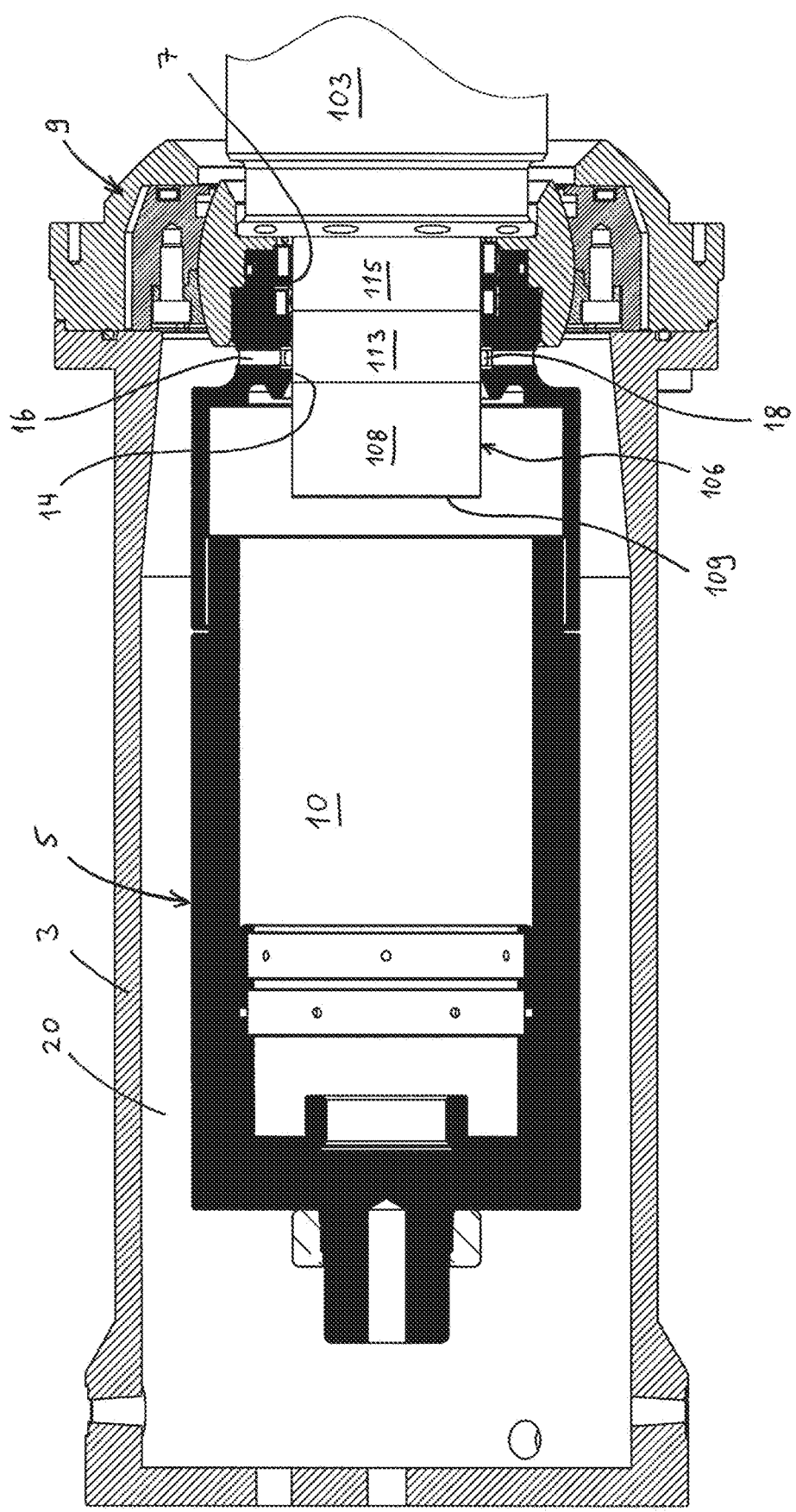
FIG. 3 is a cross section view through the female part, wherein a male pin has been partly inserted into female part.

Reference is now made to FIG. 3, which illustrates the female part 1 in an intermediate position. This is a position between the initial non-connected position shown in FIG. 1, and a connected position, which is not shown. In the shown intermediate position, the male pin 106 has been inserted into and through the male pin receiving aperture 7, thereby moving the core sleeve 21 a distance into the inner housing 5. In this position, and during the insertion, the front face 109 of the male pin 106 abuts the front face 23 of the core sleeve 21.

Before commencement of this axial insertion of the male pin 106, the male housing 103 has been aligned with the outer housing 3 and the inner housing 5 of the female part 1. Then, the male pin 106 has been moved in an axial direction, into the female part 1, during which movement, the front face 109 of the male pin 106 is in an abutting engagement with the front face 23 of the core sleeve 21.

The male pin receiving aperture 7 constitutes the entrance of the male pin 106 into the inner housing 5.

In the view shown in FIG. 3, the inner housing 5 is shown in black in order to illustrate that it comprises a closed liquid chamber 10. For illustrational purpose, several components shown in FIG. 1 have been left out in FIG. 3.

The liquid chamber 10 is filled with an electrically insulating liquid, such as oil. The skilled person will now appreciate that as the male pin 106 is inserted into the liquid chamber 10, the liquid must be displaced out of the liquid chamber 10. For this discussion, reference is made to the enlarged view of FIG. 4, showing the male pin receiving aperture 7 surrounding the partially inserted male pin 106.

The male pin receiving aperture 7 constitutes an axially forward section of an aperture channel 8 which is configured to receive the male pin. Moreover, the aperture channel 8 also has a rear section 12. The rear section 12 is positioned axially closer to the main portion of the liquid chamber 10 than the male pin receiving aperture 7. The male pin receiving aperture 7 and the rear section 12 of the aperture channel 8 continuously encircles the male pin 106, when the latter is inserted. Although not appearing from FIG. 4, there is a flushing gap 14 in the annular space between the radially inwardly facing surface of the rear section 12 and the radially outwardly facing surface of the male pin 106. Moreover, axially outside (i.e. closer to the male pin receiving aperture 7) of the rear section 12, there is a liquid exit channel 16. Thus, when the male pin 106 is inserted into the liquid chamber 10, liquid can escape the liquid chamber 10 by flowing through the flushing gap 14 and the liquid exit channel 16.

As appears from FIG. 4, depending on the size of the flushing gap 14 and the insertion velocity of the male pin 106, the liquid flowing through the flushing gap 14 will flow with a certain speed. By appropriate design of size of the flushing gap 14 and the employed insertion velocity, one can thus provide a flow speed which will clean the electric contact face 113 of the male pin 106, during insertion. An appropriate size of the flushing gap 14 may for instance be in between 0, 1 and 0.7 mm. However, the flushing gap 14 may also be smaller or larger, depending on the embodiment in question.

Advantageously, a plurality of liquid exit channels 16 can be distributed in the aperture channel 8. This will contribute to an evenly distributed flow of the liquid over the electric contact face 113. In addition, the aperture channel 8 advantageously also has a recessed distribution groove 18 which connects to the one or more liquid exit channels 16. As shown in FIG. 4, the distribution groove 18 is positioned axially outwards of the flushing gap 14. Moreover, the distribution groove 18 can advantageously extend circumferentially all the way around the aperture channel 8.

In the embodiment shown herein, the liquid displaced out from the liquid chamber 10, through the flushing gap 14 and the liquid exit channel or channels 16, will enter into liquid receiving compartment 20 defined between the inner housing 5 and the outer housing 3 of the female part 1. In order to receive the displaced liquid, the liquid receiving compartment 20 may further connect to an external, flexible liquid containment (not shown) which receives liquid from the liquid receiving compartment 20. Alternatively or in addition, a gas containing, compressible liquid container (not shown) may be arranged within the liquid receiving compartment 20.

Instead of arranging the liquid receiving compartment 20 as a space between the inner housing 5 and the outer housing 3, one may instead arrange a liquid receiving component directly in communication with the outlets of the liquid exit channel or channels 16. In such manner, one may use only one housing, corresponding to the inner housing 5 in the shown embodiment. such a liquid receiving component may for instance be a compensator.

When retracting the male pin 106, i.e. when decoupling the high voltage, subsea connection assembly, liquid from the liquid receiving compartment 20 may flow back into the liquid chamber 10 inside the inner housing 5.

FIG. 5 is an enlarged, simplified, principle sketch, showing the function of the present invention. In this view, the flushing gap 14 is indicated, thereby illustrating the possible flow path out from the liquid chamber 10.

As the skilled person will appreciate, the present invention provides a means for flushing the surface of the electric contact face 113 of the male pin 106 clean immediately before contacting the opposite electric contact face 25 of the female part 1.

FIG. 6 corresponds in large extent to the cross section view of FIG. 5. In FIG. 6, however, the male pin 106 is not of the type having a radially facing electric contact face. It may for instance have an axially facing contact face, arranged on the front end of the contact pin. In such an embodiment, the female part 1 will naturally also comprise an oppositely, axially facing electric contact face which is configured to abut and make contact with the contact face of the male pin 106.

FIG. 7 illustrates with a simplified, principle view, an embodiment where the male housing 103 has been provided with a flushing gap 14, corresponding to the flushing gap 14 discussed above. The flushing gap 14 shown in FIG. 7 may be instead of or in addition to the flushing gap 14 provided on the female housing 5.

For simplicity, identical reference numbers as above are used on the aperture channel 8, the flushing gap 14, the recessed distribution groove 18, the rear section 12, and the liquid exit channel 16. The male housing aperture 107 corresponds to the male pin receiving aperture 7 of the discussed female housing 5 above. In the shown position, the male pin 106 is being retracted into the male housing 103. Within the male housing 103 there is a male liquid chamber 110. Hence, when the male pin 106 is retracted back into the male housing 103, it displaces the liquid in the male liquid chamber 110, which flushes the radially facing face of the male pin 106, cf. the inserted arrows in FIG. 7. In this manner, introduction of water or other impurities into the male housing 103 is prevented or at least reduced. As with the embodiment discussed above, a compensator or other means to receive the dielectric liquid may be arranged in communication with the liquid exit channel 16.

It is noted that the size of the flushing gap 14 indicated in FIG. 7 is exaggerated for illustrational purpose.

The invention claimed is:

1. A high voltage, subsea connection assembly having
   a male part comprising a male housing with a liquid chamber with a dielectric liquid, and a male housing aperture, wherein a male pin is supported in the male housing and positioned within the male housing aperture;
   a female part with a female housing with a liquid chamber with a dielectric liquid, and a male pin receiving aperture;
   wherein the male pin is axially movable into and out of the female housing through the male pin receiving aperture, between a non-inserted non-connected position and an inserted connected position, the female housing comprises an electric contact face which is configured to contact an electric contact face of the male pin when the male pin is in the inserted connected position, wherein the male pin receiving aperture or the male housing aperture constitutes a forward section of an axially extending aperture channel configured to encompass an axial section of the male pin;
   wherein the aperture channel has a rear section, the radial inwardly directed face of which together with an outer radial face of the male pin defines a flushing gap when the male pin is positioned in the rear section; and
   wherein at least one liquid exit channel is arranged in the aperture channel, in a position between the rear section, and the male pin receiving aperture or the male housing aperture, respectively.

2. The high voltage, subsea connection assembly according to claim 1, wherein the liquid exit channel constitutes the only liquid exit path out of the liquid chamber.

3. The high voltage, subsea connection assembly according to claim 1, wherein the electric contact face of the male pin is facing in an outwardly radial direction, and that the electric contact face in the female housing faces in an inwardly radial direction.

4. The high voltage, subsea connection assembly according to claim 1, wherein the female housing or the male housing is arranged within an outer housing, wherein the liquid exit channel communicates between a liquid receiving compartment and the liquid chamber, wherein the liquid receiving compartment is between the female housing or the male housing, and the outer housing.

5. The high voltage, subsea connection assembly according to claim 1, wherein:
- the female part comprises the flushing gap and that in the female part
- the electric contact face is arranged within the liquid chamber;
- the rear section of the aperture channel is arranged axially between the liquid exit channel and the electric contact face; and
- the liquid exit channel is arranged axially between the rear section and the male pin receiving aperture.

6. The high voltage, subsea connection assembly according to claim 1, wherein a distribution groove encircles the aperture channel in a position axially between the rear section and the male pin receiving aperture or the male housing aperture, respectively, and that a plurality of liquid exit channels communicate between the distribution groove and the outside of the female housing or the male housing, respectively.

* * * * *